United States Patent [19]
Schulte et al.

[11] Patent Number: 6,039,384
[45] Date of Patent: Mar. 21, 2000

[54] DOOR SHELL OF A VEHICLE

[75] Inventors: Martin Schulte, Balve; Ulrich Levermann, Neuenrade-Blintrop, both of Germany

[73] Assignee: Schade GmbH & Co. KG, Plettenberg, Germany

[21] Appl. No.: 09/191,103

[22] Filed: Nov. 12, 1998

[30]     Foreign Application Priority Data

Nov. 13, 1997 [DE] Germany .............. 197 50 343
Jul. 1, 1998 [DE] Germany .............. 198 29 457

[51] Int. Cl.[7] .................................................. B60J 5/04
[52] U.S. Cl. ..................... 296/146.2; 296/146.5
[58] Field of Search .................. 296/146.2, 146.5, 296/146.6; 49/502

[56]                 References Cited

U.S. PATENT DOCUMENTS

| 4,365,443 | 12/1982 | Miura ................................ 49/502 |
| 4,575,968 | 3/1986 | Mariel ................................ 49/502 |
| 4,684,166 | 8/1987 | Kanodia ............................ 296/146 |
| 4,769,951 | 9/1988 | Kaaden ............................. 49/502 |
| 4,831,710 | 5/1989 | Katoh et al. ................... 49/502 X |
| 4,843,762 | 7/1989 | Grier et al. .................. 49/502 X |
| 5,086,589 | 2/1992 | DiBenedetto ................... 49/502 |
| 5,107,624 | 4/1992 | Passone ........................... 49/502 |
| 5,325,623 | 7/1994 | Djavairian et al. .............. 49/502 |
| 5,548,930 | 8/1996 | Murando .......................... 49/502 |
| 5,581,947 | 12/1996 | Kowall ........................ 49/502 X |
| 5,787,645 | 8/1998 | Hein et al. ..................... 49/502 |

FOREIGN PATENT DOCUMENTS

| 4027449 | 5/1992 | Germany . |
| 4331616 | 3/1995 | Germany . |

*Primary Examiner*—D. Glenn Dayoan
*Assistant Examiner*—Lori L. Coletta
*Attorney, Agent, or Firm*—Ostrolenk, Faber, Gerb & Soffen, LLP

[57]                 ABSTRACT

The invention relates to a door shell of a motor vehicle whose door housing is connected to a window frame consisting of a profile. To allow the door shell to be manufactured at favourable cost in a manner adjusted to the strains occurring, it is provided that adjacent to the upper region of the profile close to the roof, sheet blanks which widen the cross-sections of the window frame in the direction of the door housing are connected on both sides to the upper region are, in turn, connected to the door housing or the A and B pillars of the door housing.

13 Claims, 12 Drawing Sheets

FIG. 10
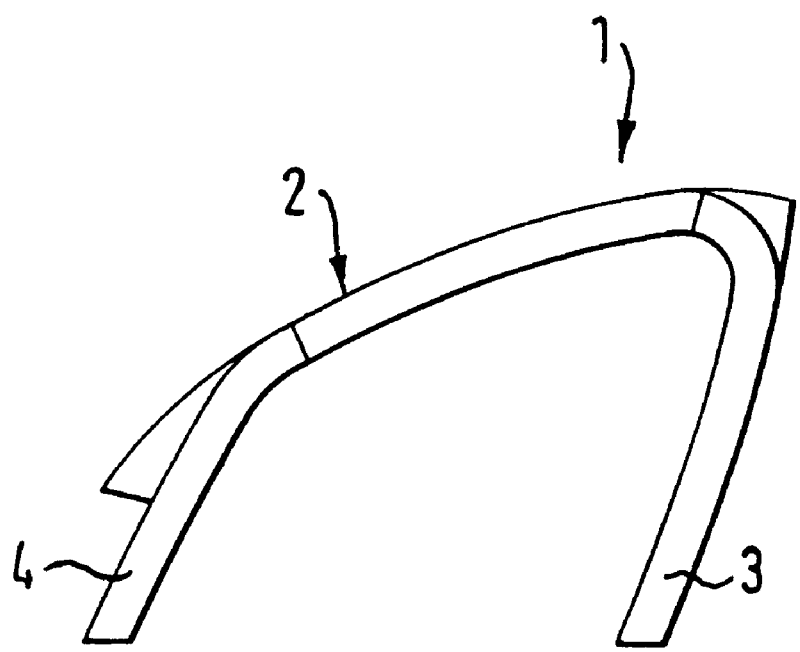
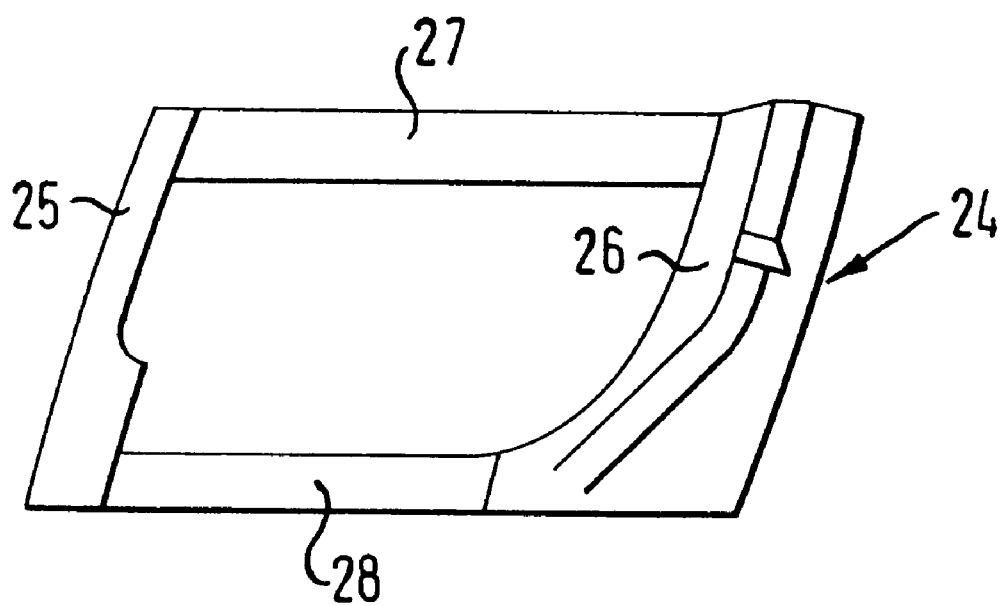

FIG. 12
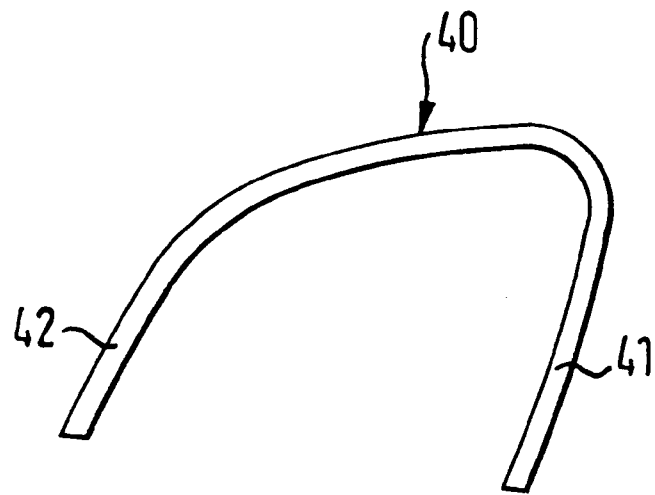
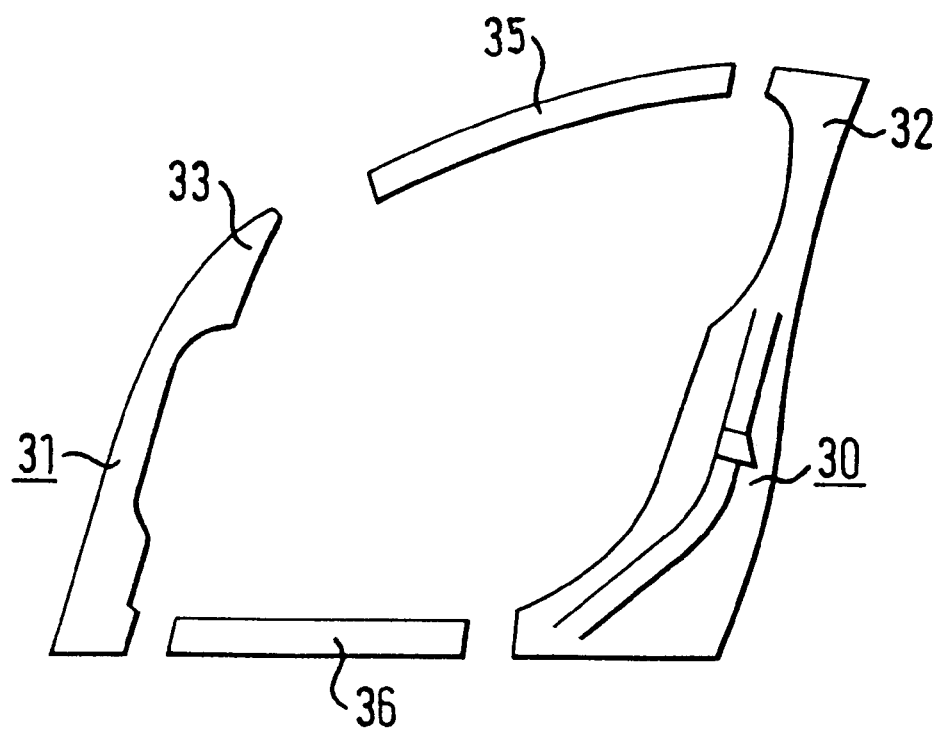

DOOR SHELL OF A VEHICLE

BACKGROUND OF THE INVENTION

1. Field of the Invention

The invention relates to a door shell of a motor vehicle, in which the door shell includes a door housing connected to a window frame consisting of a profile.

2. Description of Related Art

Door shells for motor vehicles are manufactured in accordance with their basic design in the form of frame doors or stamped doors.

One substantial part of the frame door is the door framework which comprises the door housing located under the window opening and the window frame connected to said door housing, and which is covered with the outer panel to form the finished door after the installation of the window pane, the window frame of the door framework forms the guides for the window pane to slide up and down this and for the window winding mechanism along an inside lining thereof. The door housing of such frame doors consists of lateral end parts which, for reasons of simplicity, are designated at the front motor vehicle door as the A-pillar or hinge plate (on the hinge side) and as the B-pillar or lock plate (on the lock side) because they are adjacent to the A and B pillars of the body shell. The A and B pillars are connected below the window opening by a carrier, preferably a hollow carrier consisting of a profile, forming a window channel reinforcement and on the floor side by a sheet blank or a profile.

If vehicle doors need to be manufactured in very large numbers, stamped doors whose frameworks consist of stamped, integrally formed semi-monocoques are economic.

Frame doors of the type first described are known, for example, from DE 40 27 449 A1 and DE 43 31 616 A1. In these, the window frame consists of extrusion profiles or of profiles made by roll forming which are connected to the A and B pillars (consisting of sheet blanks) of the door housing. With such frame doors, the profile forming the window frame is exposed to the greatest stresses and bending strains in the region of the opening of the profile legs into the door housing or in the connection region of the ends of the profile with the A and B pillars. For this reason, it is necessary to design the cross-section of the profile forming the window frame to accommodate the regions exposed to the greatest stress. Due to its constant cross-section, the profile is oversized in the upper region near the roof.

SUMMARY OF THE INVENTION

It is therefore an object of the invention to provide a door shell of the type first given which can be manufactured at favourable cost in a manner suitable for the strains exerted on the door shell.

This object is achieved in accordance with the invention in that adjacent to the upper region (near the roof) of the profile, sheet blanks are connected to said profile on both sides which expand the width of the window frame and which are, in turn, connected to the A and B pillars of the door housing.

With the door shell in accordance with the invention, the upper region of the profile forming the window frame consists of a profile with a thickness and cross-section which is adapted to accommodate the stresses placed on the lower regions so that the cross-section of the profile is optimised in accordance with the actual stress and so that a result of the reduced amount of material in the cross-section, weight and cost savings are achieved.

In accordance with the present invention, the legs or end regions of the profile forming the window frame are connected to the door housing or the A and B pillars of the door housing by the sheet blanks. The sheet blanks can be manufactured favourably as stamped parts or also as cast parts, for example as cast parts by the thixo-forming method (from aluminum, aluminum alloys or an aluminum magnesium alloy).

In the door shell in accordance with the invention, the cross-section of the window frame is optimised not only over its length in accordance with the stresses to be expected, but the quality of the door shell is also increased overall and thus meets the increased demands.

Portions of the cross-section of the profile is cut away along appropriate regions thereof and the sheet blanks are connected to the cut regions. The cuts can be made simply and precisely by, for example, laser cutting, whereupon the profile can be adapted in an optimum manner to the shape of the sheet blanks to be connected.

Appropriately, the profile is cut in such a way that the door housing region can be broadened by attaching the sheet blanks.

Naturally, the profile can also be cut in its region near the roof to adapt it to the type of packings or packing strips to be attached.

In accordance with a preferred embodiment, the cross-section of the profile includes a hollow shape and two integrally formed, freely narrowing arms or legs extending therefrom, on which the cuts are performed. This profile obtains its inherent stiffness from the hollow cross-sectional shape with additional stiffness being achieved due to the arms or legs which can be additionally bent and angled as needed and which can easily be cut in the desired shape.

The cut regions can be joined with the edges of the sheet blanks and welded together in the joint region. In accordance with the preferred embodiment, straight profile sections are provided with recesses or cut-aways which accept the corresponding straight sections of the sheet blanks. The profile sections provided with the recesses or cut-aways can be designed to be thicker in cross-section. Due to the overlapping attached surfaces of the sheet blanks to the recesses or cut-aways of the profile, particularly favourable and strong connections can be achieved.

The profile and sheet blanks can be secured together with screw or rivet connections, although weld connections are preferred. Particularly good connections can be achieved with laser welds.

The sheet blanks can be adapted easily to special demands. In accordance with a preferred embodiment, the B pillar sheet blank includes the upper corner area of the window frame.

In accordance with another preferred embodiment, the A pillar sheet blank includes a mirror triangle (mirror connection piece).

To obtain a good external appearance, the connection regions between the profile and sheet blanks can be covered by packings or packing strips so that weld seams or other connections are not visible.

In accordance with another embodiment, the object is achieved in accordance with the invention in that the door housing has an A pillar and a B pillar which consist of sheet blanks whose upper regions form the lateral regions of the window frame and that a profile forming the upper section of the window frame is connected to the upper ends of the upper regions.

In this embodiment of the invention, those parts of the A and B pillar extend above the lower edge of the window opening to form the side parts of the window frame and have been adjusted in their cross-sections to accommodate the strains to be expected, while only upper region of the window frame near the roof consists of a profile, for example, an extrusion profile or a rolled profile, whose cross-section is adapted to only accommodate the lower strains.

The sheet blanks can be connected to one another by the window channel reinforcement and another profile or also another sheet blank forming the lower edge of the door shell.

Above, the door shell in accordance with the invention has been described with respect to a front door of a motor vehicle. Of course, all vehicle doors can be constructed in a corresponding manner as long as they are provided with window sections.

Embodiments of the invention are explained in more detail below with reference to the drawings.

BRIEF DESCRIPTION OF THE DRAWINGS

FIG. 10 is a schematic representation of a window frame and a door housing prior to their connection to each other.

FIG. 12 is a representation corresponding to FIG. 11 with an alternative type of connection of the window frame to the door housing.

DETAILED DESCRIPTION OF THE PREFERRED EMBODIMENTS

Figure 1:
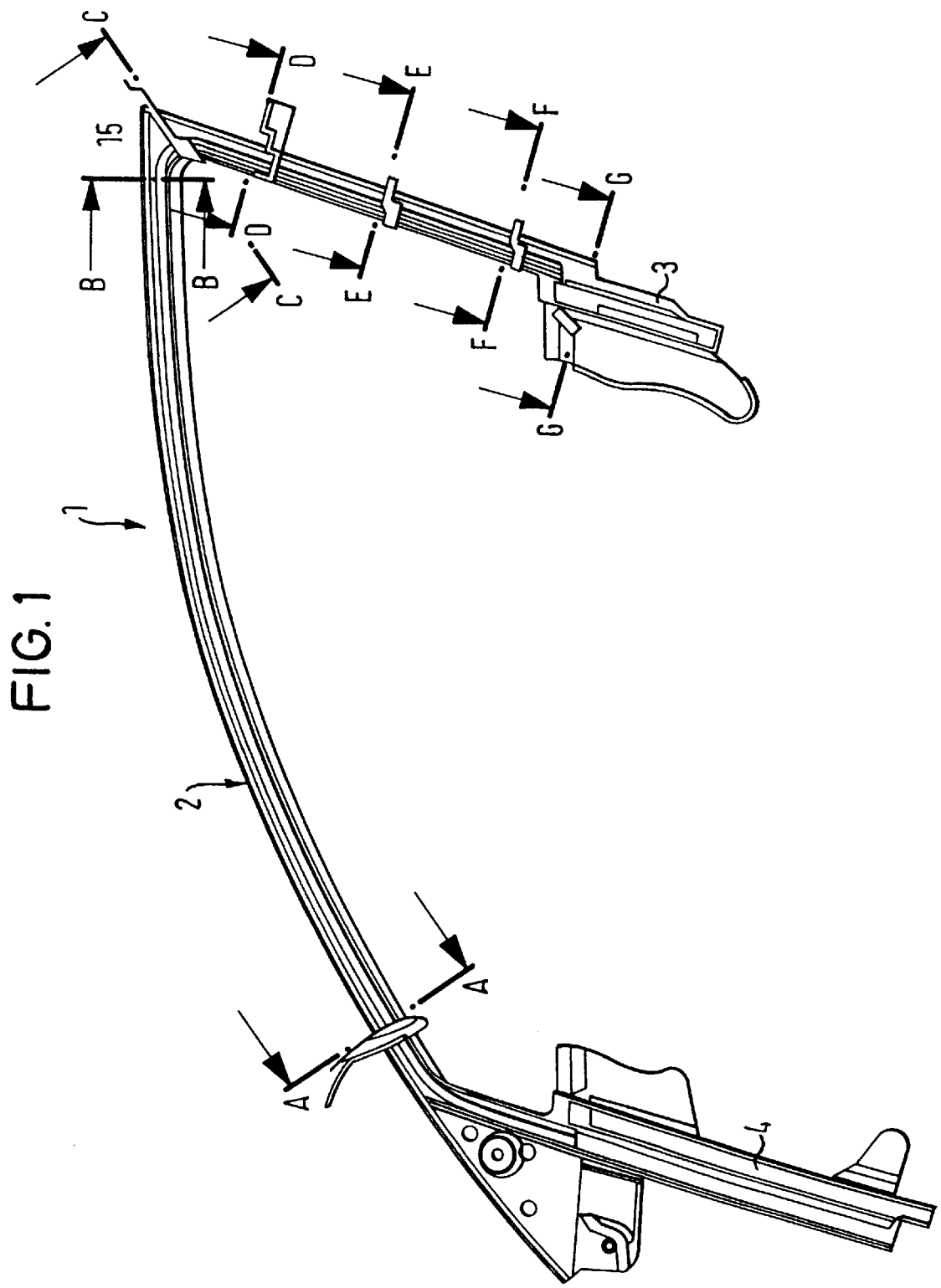
FIG. 1 shows a side view of a window frame consisting of a bent profile whose legs are welded to sheet blanks.

FIG. 1 reveals a side view of a window frame 1 which is formed by a bent extrusion profile 2 made of aluminum or an aluminum alloy whose legs are connected to sheet blanks 3, 4 which are, in turn, screwed or welded to the (not shown) door housing or the A and B pillars of the door housing.

Figure 2:
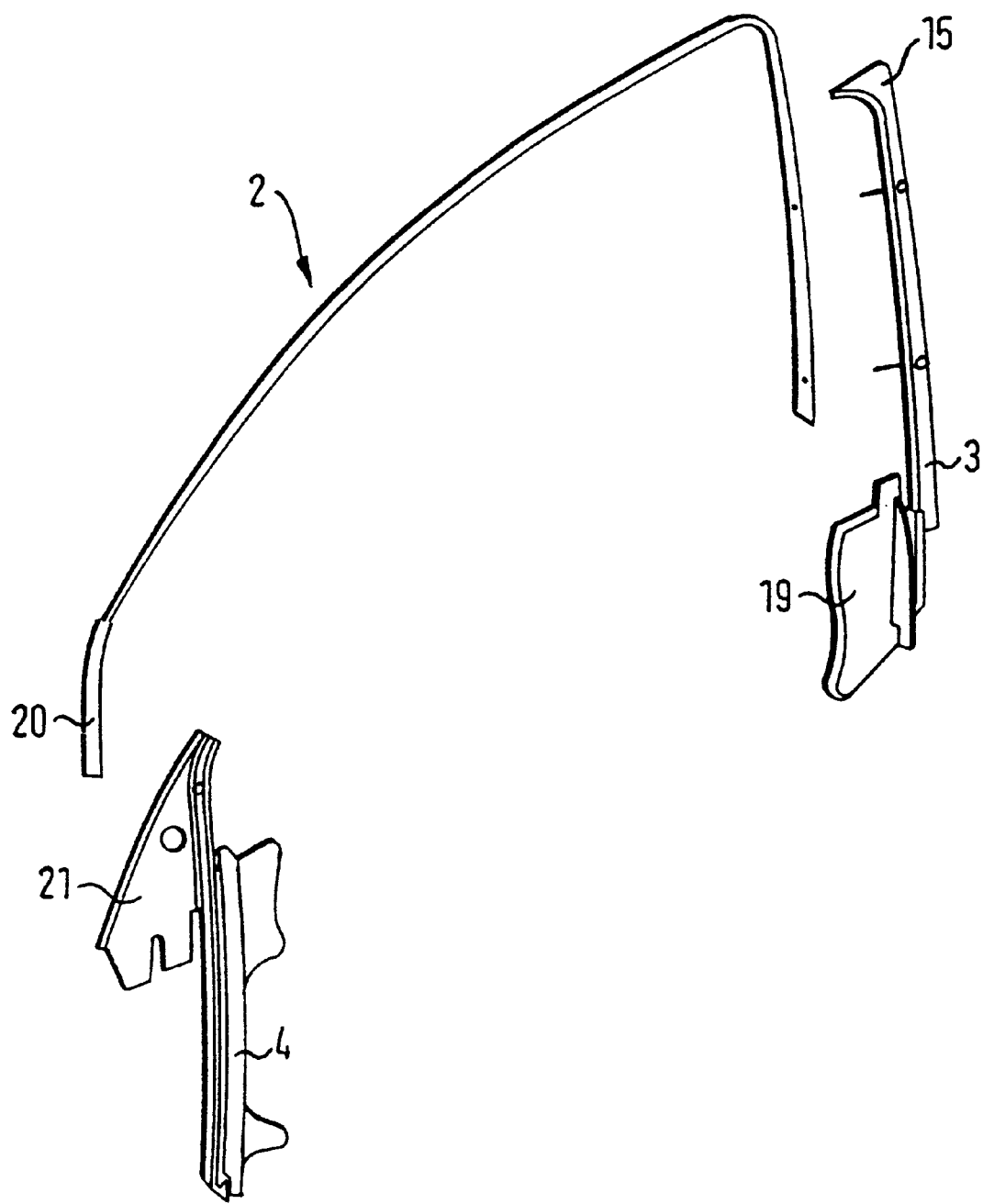
FIG. 2 shows the window frame of FIG. 1 in an exploded view of its components.

FIG. 2 reveals the bent profile 2 and the sheet blanks 3, 4 in an exploded state prior to their being welded together. As can be seen in this figure, bent profile 2 has a relatively small width along its length. Since increased forces are placed on the "legs" of the bent profile in the region of the door panel, attaching appropriately shaped sheet blanks 3, 4 to the legs of the profile serve to expand the width and cross-section of the profile 2 as needed, to provide added support and stability to regions where increased forces may be expected.

Since the upper region (substantially horizontal) of the window frame generally receives the least amount of stress forces, the profile is designed to withstand such minimal forces, and therefore it is not necessary to attach a sheet blank to the region. The profile 2 has been cut prior to its welding to the sheet blanks 3, 4 to create stress-optimised cross-sections, as will be described below with reference to FIGS. 4 through 9.

Figure 3:
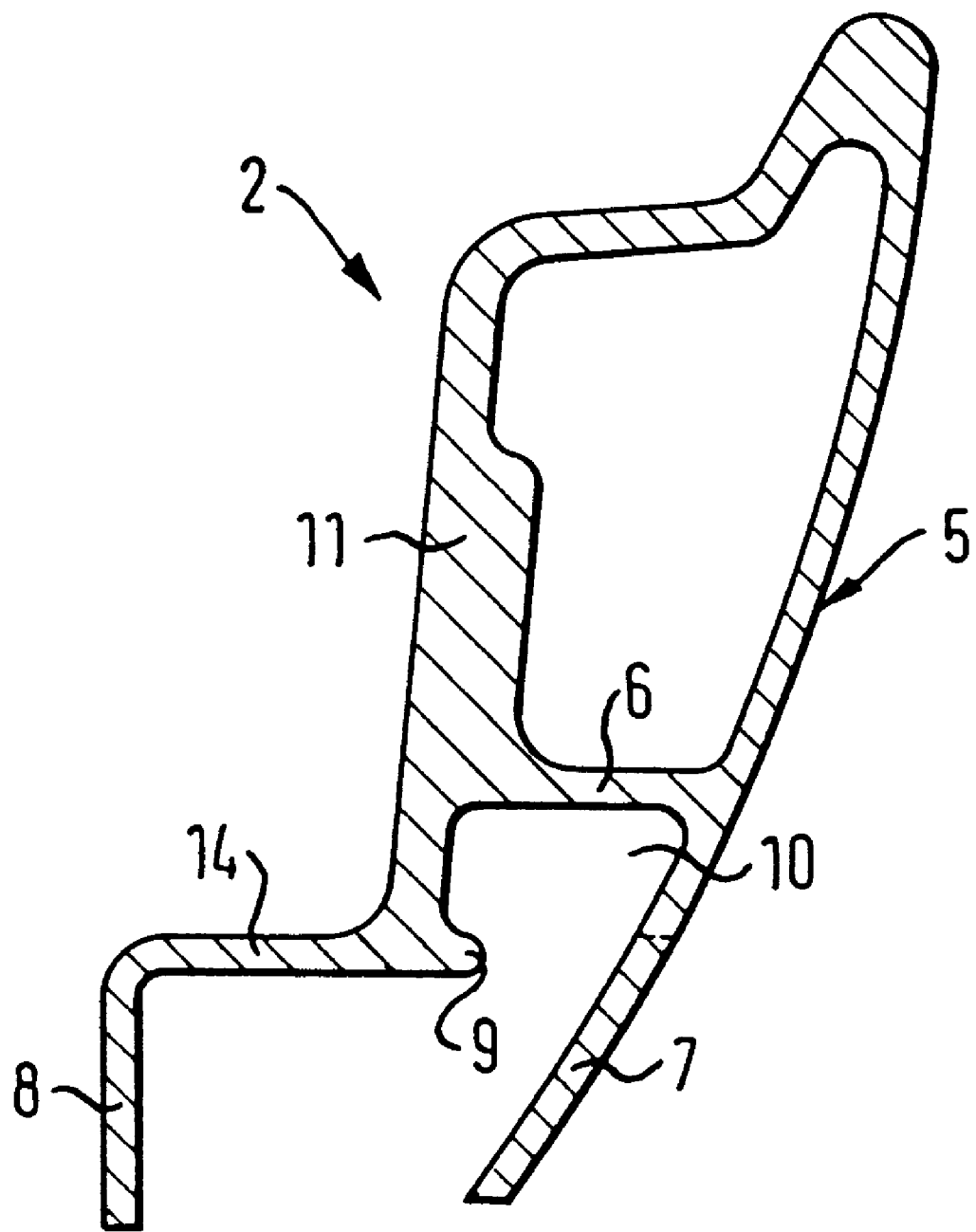
FIG. 3 shows a cross-section through the uncut profile of the door frame from FIGS. 1 and 2.

A cross-section through the uncut profile is illustrated in FIG. 3. The cross-section thereof shows the profile part 5 forming a hollow duct or conduit enclosed by a diagonal arm 6 and having two narrowing legs 7, 8 extending therefrom, of which the leg 8 is doubly bent or angled. Between the legs, a groove 10 is formed and which has a protrusion 9 formed on one side at the opening thereto. The groove 10 cooperates with the protrusion 9 to hold a packing strip in the groove 10. Moreover, at least a portion of one side of the enclosed duct or conduit has a thickened wall 11, which may be cut to reduce the thickness to provide a large surface for contacting a sheet blank. Thus, the uncut profile has this cross-section along its entire length.

The profile 2 has been cut from the cross-sectional shape of FIG. 3 such that the cross-sectional views of the cut regions appear as shown in FIGS. 5 to 9 according to the contours of the sheet blanks 3, 4, prior to its welding to the sheet blanks 3, 4 so that the profile and sheet blanks can be appropriately fitted together and attached to provide stress-optimised cross-sections of the window frame 1.

Figure 4:
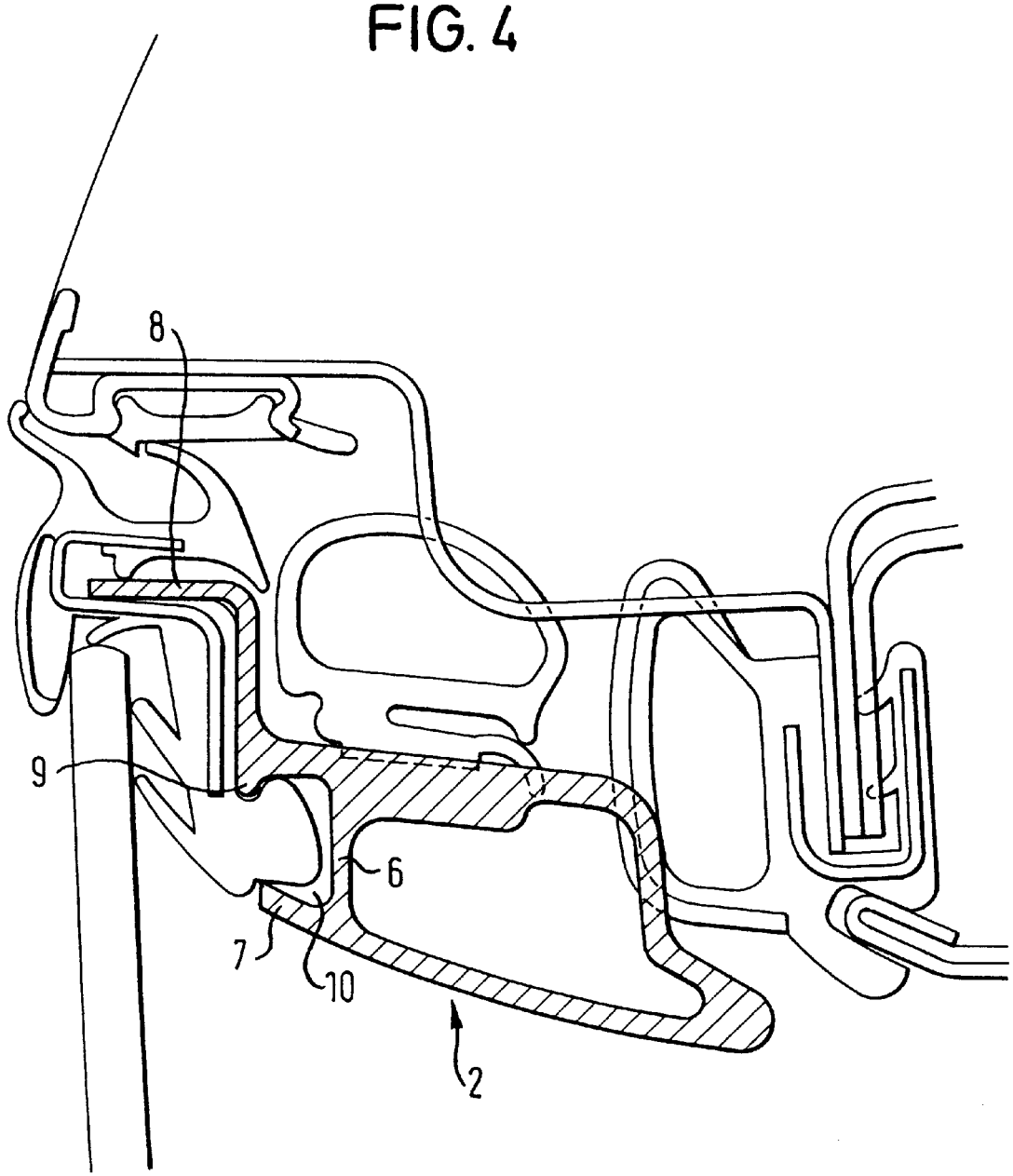
FIG. 4 shows a cross-section through the window frame of FIG. 1 along the section A—A.

As can be seen from FIG. 1 and FIG. 4 (section A—A in FIG. 1), the profile 2 has also been cut along the upper region of the window frame to allow the insertion of a packing strip into the groove 10. For this purpose, the cross-sectional leg 7 has been cut away in the manner shown so that its resulting length substantially corresponds to the protrusion 9 limiting the groove 10.

FIGS. 4 to 9 also show the cross-sections of other elements not of interest here in addition to the cross-sections of the profile 2 and the sheet blank 3. Hence, the cross-sections of the profile and of the sheet blank 3 have been emphasized by cross-hatch patterning.

Figure 5:
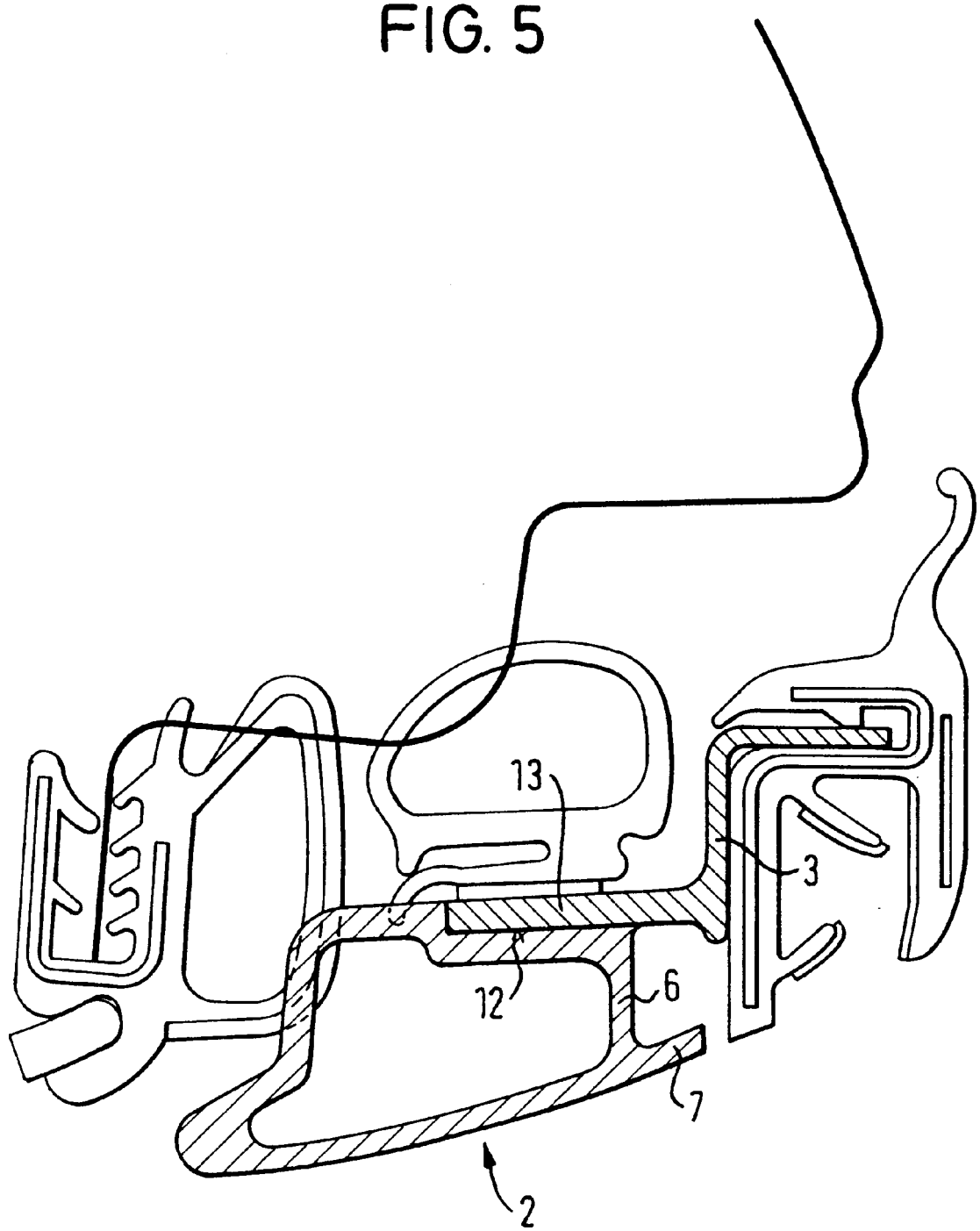
FIG. 5 shows a cross-section through the window frame of FIG. 1 along the section B—B.
Figure 6:
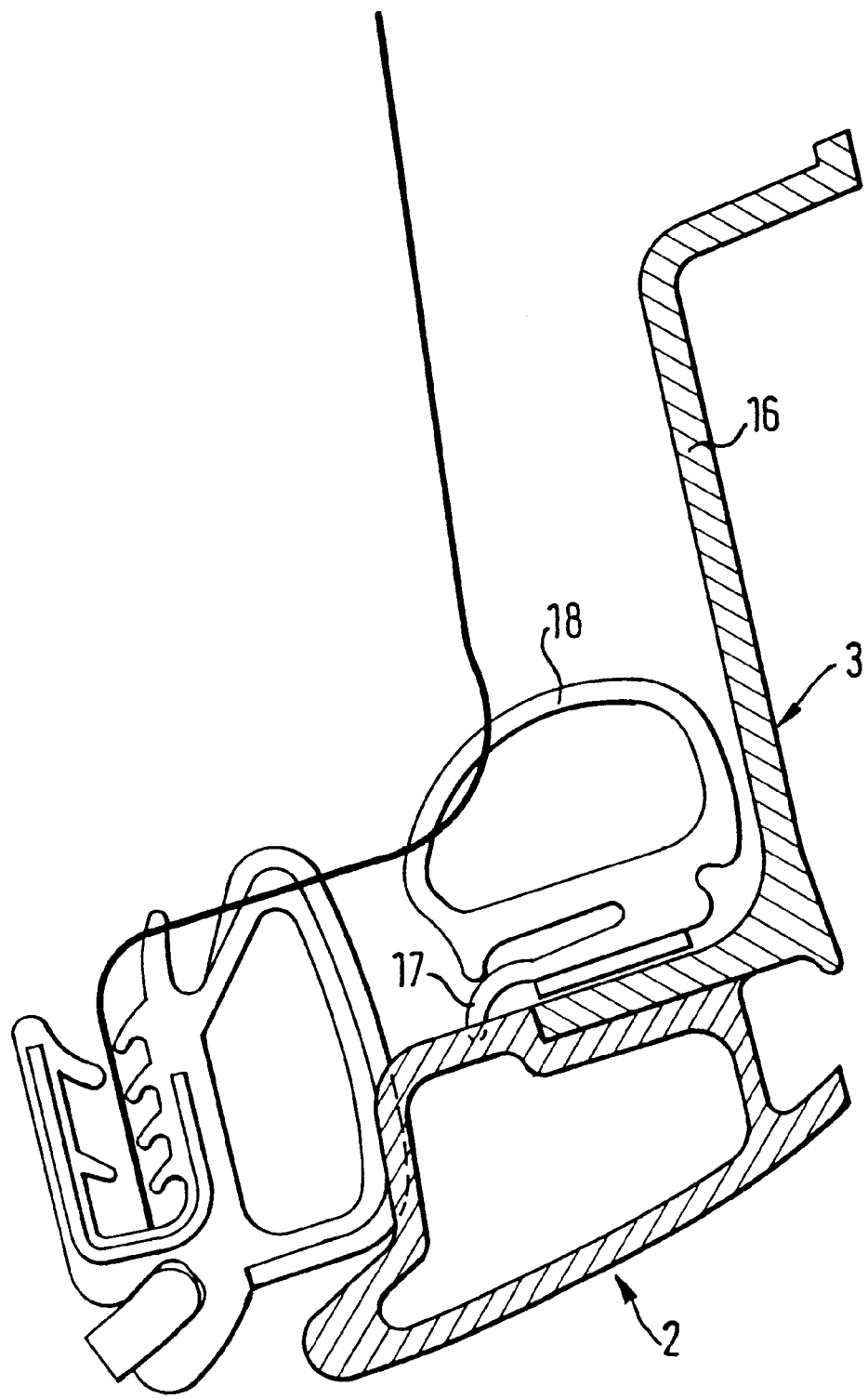
FIG. 6 shows a cross-section through the window frame of FIG. 1 along the section C—C.
Figure 7:
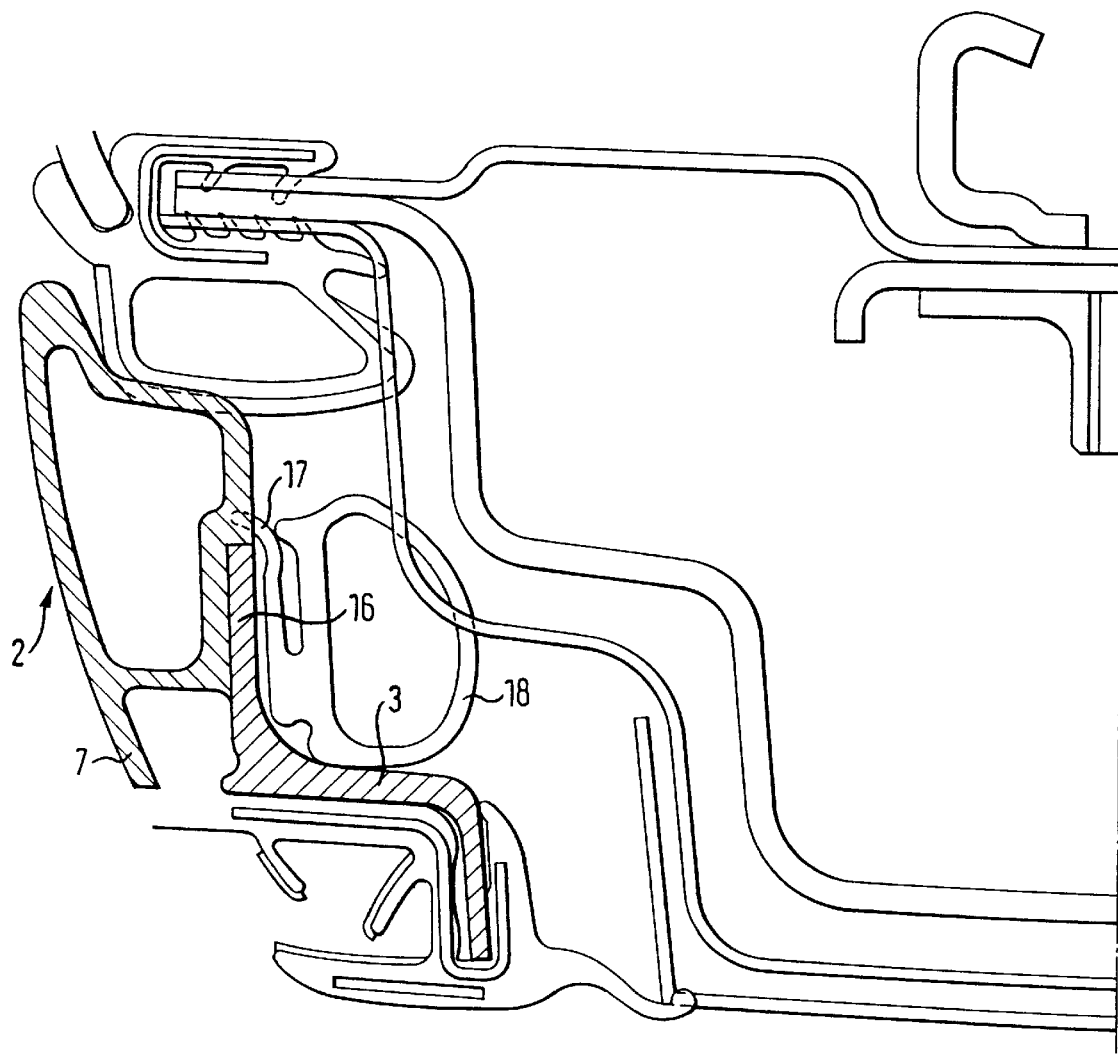
FIG. 7 shows the cross-section through the window frame of FIG. 1 along the section D—D.
Figure 8:
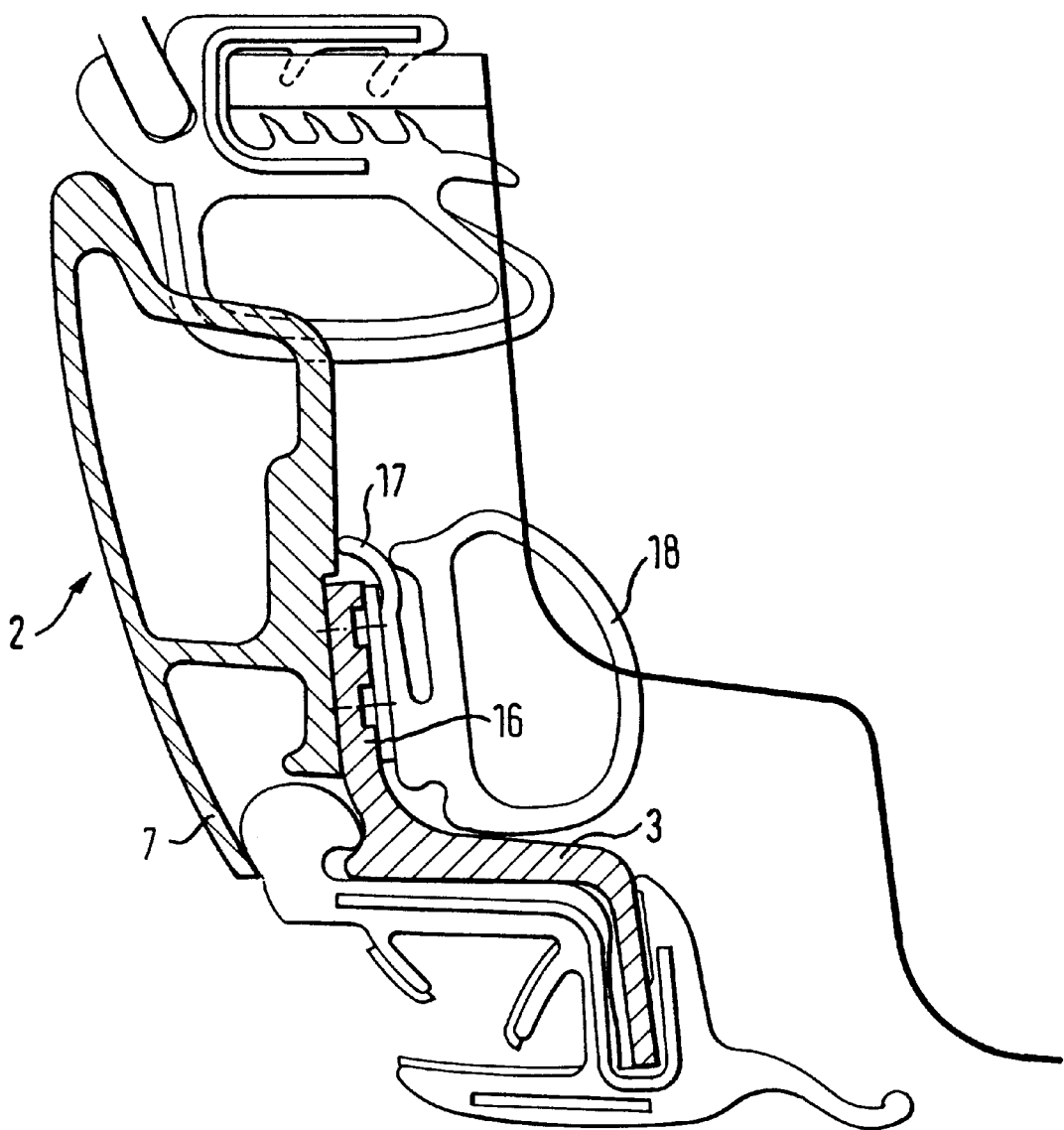
FIG. 8 shows the cross-section through the window frame of FIG. 1 along the section E—E.
Figure 9:
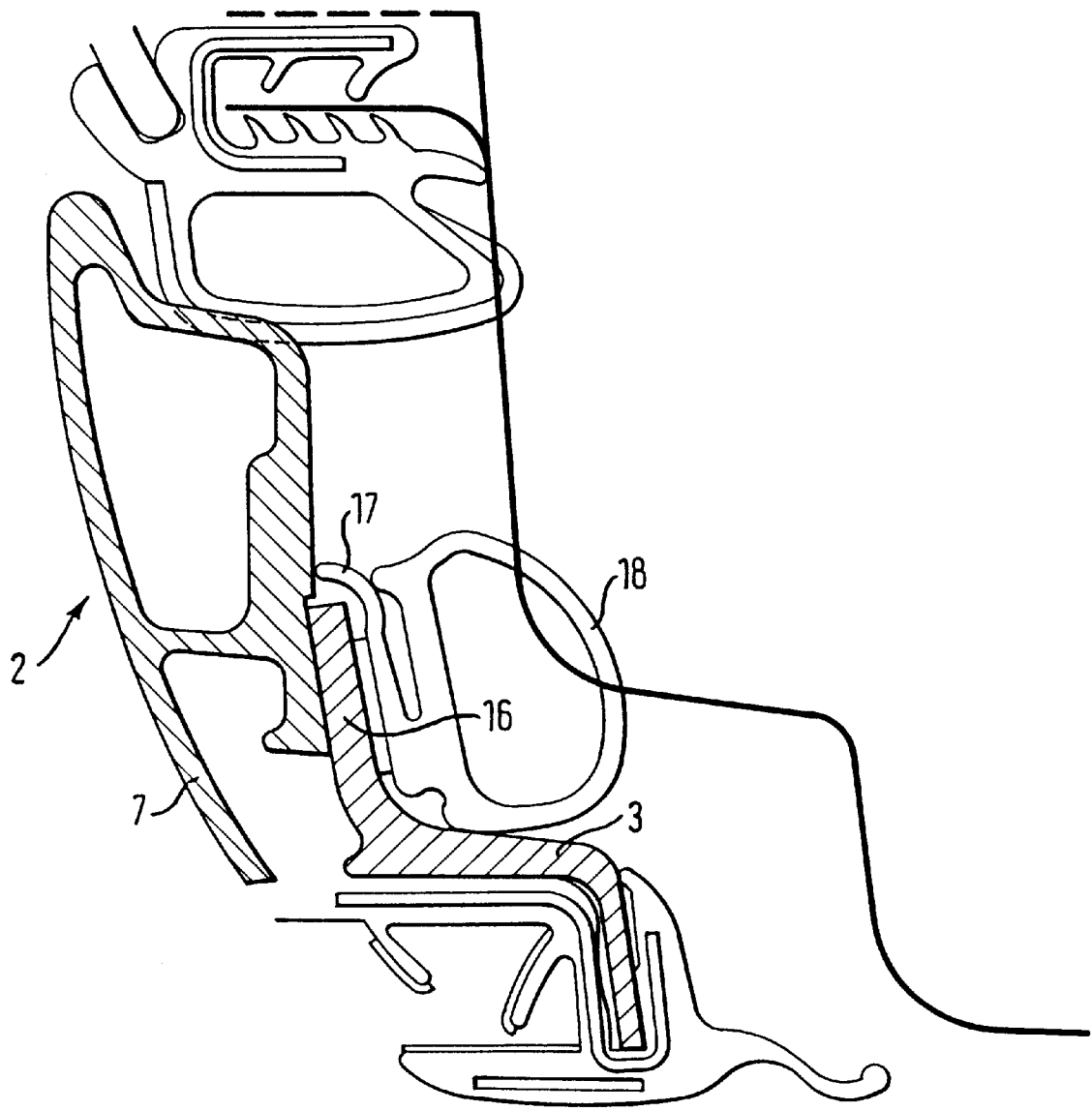
FIG. 9 shows the cross-section through the window frame of FIG. 1 along the section F—F.

In FIG. 5, the section B—B in FIG. 1 is visible which shows a cross-section of the connection region of the sheet blank 3 to the cut profile 2. Here, the cut has been made in such a manner that the double angled cross-sectional leg 8 has been removed and a shoulder 12 has been cut into the thickened region 11 of the profile 2 in which a leg 13 of the sheet blank 3 is positioned and connected to the profile 2 by laser welding.

By comparing the cross-section of FIG. 5 with that of the uncut profile in FIG. 3, it can be seen that the protrusion 9 and the arm part 14 (which is roughly diagonal to the leg 7) of the leg 8 of the profile 2 has also been removed, thus allowing the profile to be bent into an acute angle in the manner visible in FIGS. 1 and 2. The upper corner region of the window frame is formed by the particular corner design 15 of the sheet blank 3 which is then connected to the profile 2 at the acute angled bend.

As can be deduced from the cross-sections 6 to 9 taken at sections C—C to F—F, respectively, in FIG. 1, less of the profile cross-sectional leg 7 is cut away and the cross-sectional leg 16 of the sheet blank 3 becomes increasingly longer moving down the length of the profile leg toward the door housing (not shown) whereby the surface of the window frame is broadened into the region of the door housing so as to become capable of withstanding greater stress in such region.

In the embodiment shown, the connection between the sheet blank 3 and the profile 2 is made by laser welding. The weld seam region is, as can be seen from FIGS. 6 to 9, covered by a lip 17 of the packing strip 18.

The sheet blank 3 possesses at its lower end region a widened connection part 19 to connect to the B pillar of the door housing. The connection can be made by welding or screwing.

As with the pillar B, the A pillar of the door housing is also connected to the leg 20 of the profile 2 which has been cut as described above to enable fitting engagement with sheet blank 4. The sheet blank 4 is provided with the integral mirror triangle 21. The manner in which the leg 20 is cut as viewed in cross-section, the connection of the cut leg 20 with the sheet blank 4 and the connection of the sheet blank 4 with the door housing or the A pillar corresponds in kind with the cut, connection and attachment on the B pillar side.

In FIG. 10, a type of attachment of a window frame 1 with the door housing 24 is visible. The window frame 1 is formed in accordance with its general structure of the cut profile 2 and the sheet blanks 3, 4. The lower portions of the sheet blank 3, 4 are connected to the A pillar 25 and B pillar 26 (both comprising sheet blanks) of the door housing by means of screw or weld connections. The A and B pillars are, in turn, connected to each other underneath the window opening by another profile 27 forming a window channel reinforcement and a lower profile or another sheet blank 28.

Figure 11:
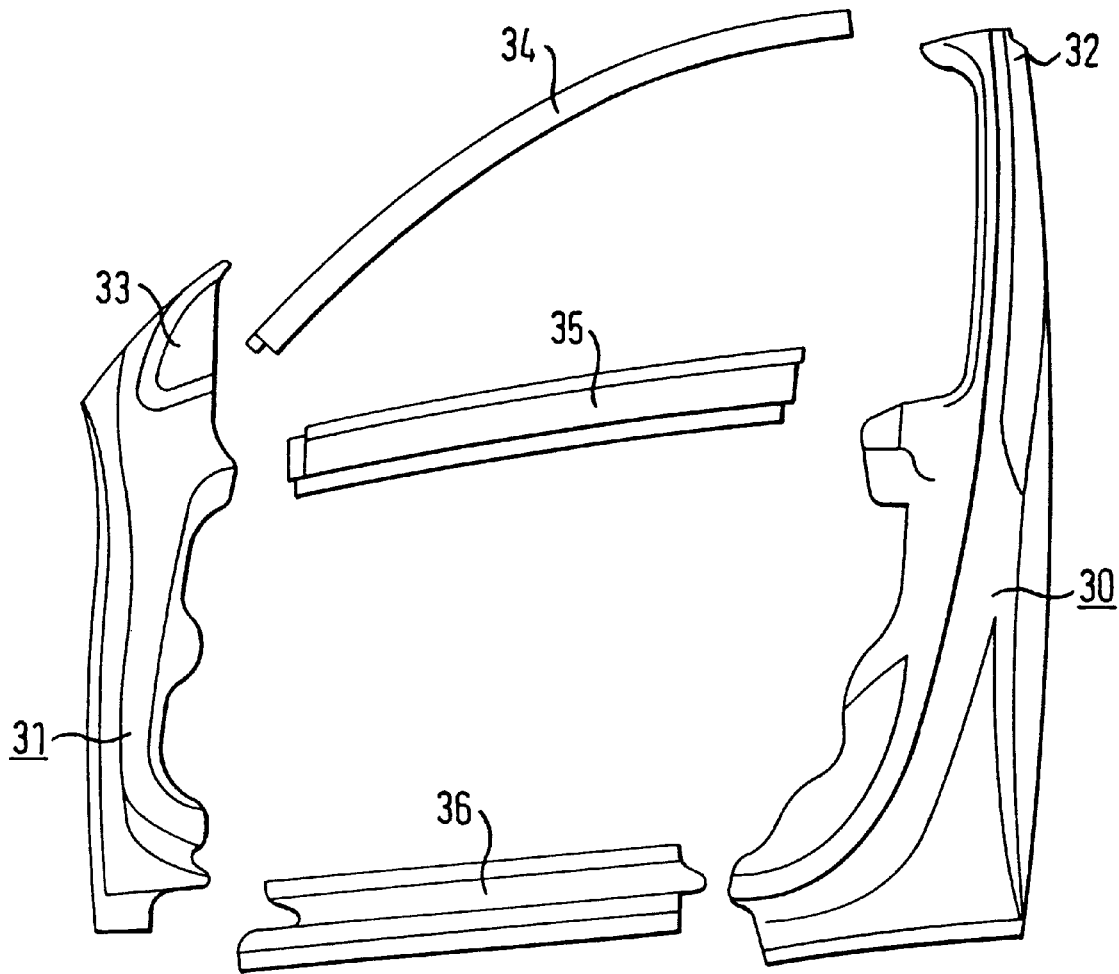
FIG. 11 is a side view of a second embodiment of a door shell in a schematic side view.

In the second embodiment of the invention as shown in FIG. 11, the door housing comprises a sheet blank 30 forming the B pillar and a sheet blank 31 forming the A pillar. Both of these sheet blanks extend laterally above the lower edge of the window opening, with the parts 32, 33 of the A and B pillars actually forming the lateral regions of the window frame, rather than simply being attached to the window frame in these regions. The bent profile 34 is connected to the upper end regions of the parts 32, 33 by, for example, butt welding.

The A pillar and B pillar sheet blanks 30, 31 are welded together below the window opening via a second profile 35 forming a channel reinforcement and at the lower edge via a third profile 35.

In FIG. 12, an alternative type of attachment of that part of the window frame formed by a bent profile to the A and B pillars is shown. The profile 40 is substantially U shaped with its legs 41, 42 being welded to the A and B pillars. To achieve a good and flush weld, the profile legs 41, 42 are cut as described above to obtain sufficient contact surfaces between the profile 40 and the A and B pillars.

We claim:

1. A door shell of a motor vehicle, comprising:

a door housing having an A pillar and a B pillar;

a window frame formed by a shaped profile, the shaped profile having a uniform width along its length, a cross-section, an upper region positioned so as to be spaced above the door housing, a first side corresponding to the A pillar, and a second side corresponding to the B pillar;

a first sheet blank attached to the upper region of the profile at the first side and extending toward the door housing from the upper region of the profile, the first sheet blank being connected to the A pillar of the door housing; and a second sheet blank attached to the upper region of the profile at the second side and extending toward the door housing from the upper region of the profile, the second sheet blank being connected to the B pillar of the door housing, and wherein the first and second sheet blanks increase in width from the upper region of the profile toward the door housing so as to provide a contact surface area with the door housing having a width greater than the width of the profile.

2. A door shell in accordance with claim 1, wherein a portion of the profile cross-section has been cut away along regions of the first and second sides of the shaped profile and wherein the first and second sheet blanks are respectively connected to the cut regions.

3. A door shell in accordance with claim 1, wherein the cross-section of the profile is cut along the upper region for attachment of packings or a packing strip.

4. A door shell in accordance with claim 1, wherein the cross-section of the profile includes a hollow shape with two attached legs which may be cut away as necessary along the length of the profile.

5. A door shell in accordance with claim 2, wherein the cut regions of the first and second sides of the shaped profile are joined with edges of the sheet blanks and wherein the cut regions and the sheet blanks are welded together along the joined surfaces.

6. A door shell in accordance with claim 4, wherein the profile cross-section has at least one straight section which is provided with recesses or can be partially cut away to fittingly contact corresponding straight sections of the sheet blanks.

7. A door shell in accordance with claim 6, wherein the profile and sheet blanks, and the sheet blanks and door housing are attached by welding, screw or rivet connections.

8. A door shell in accordance with claim 1, wherein the second sheet blank connected to the B pillar forms an upper corner design of the window frame.

9. A door shell in accordance with claim 1, wherein the first sheet blank connected to the A pillar forms a mirror triangle (mirror connection piece).

10. A door shell in accordance with claim 1, wherein connection interfaces between the profile and the sheet blanks are covered by packings or a packing strip.

11. A door shell in accordance with claim 1, wherein, in addition to the profile forming the upper region of the window frame, the first and second sheet blanks are further connected via a window channel reinforcement and another profile or another sheet blank forming a lower edge of the door housing.

12. A door shell in accordance with claim 1, wherein the first and second sheet blanks attached to the first and second sides of the profile each have a greater width in the region connected to the A and B pillars of the door housing than the width of the profile, whereby a width of the door housing can be widened in accordance with the width of the first and second sheet blanks at the connected regions to the A and B pillars.

13. A door shell of a motor vehicle, comprising:

a door housing having an A pillar and a B pillar;

a window frame having an upper region, a first lateral region, and a second lateral region, wherein the upper region is formed by a shaped profile positioned so as to be spaced above the door housing;

a first sheet blank having a lower portion which forms the A pillar of the door housing and an upper portion which forms the first lateral region of the window frame and is attached to the upper region of the window frame; and a second sheet blank having a lower portion which forms the B pillar of the door housing and an upper portion which forms the second lateral region of the window frame and is attached to the upper region of the window frame.

* * * * *